United States Patent [19]

Bader

[11] Patent Number: 5,192,429
[45] Date of Patent: Mar. 9, 1993

[54] SELF-CLEANING FILTER

[76] Inventor: Bernard R. Bader, 6802 Bristol Way, Yakima, Wash. 98908

[21] Appl. No.: 724,190

[22] Filed: Jul. 1, 1991

[51] Int. Cl.[5] .......................................... B01D 29/15
[52] U.S. Cl. .................................. 210/170; 210/411; 210/413; 210/416.1
[58] Field of Search ............ 210/355, 409, 411, 416.2, 210/416.3, 413, 416.1, 170, 415

[56] References Cited

U.S. PATENT DOCUMENTS

| | | | |
|---|---|---|---|
| 3,616,914 | 11/1970 | Reid | 210/355 |
| 3,622,006 | 11/1971 | Brunner | 210/355 |
| 4,054,528 | 10/1977 | Treiber | 210/355 |
| 4,217,220 | 8/1980 | Egli et al. | 210/413 |
| 4,261,822 | 6/1981 | Richardson | |
| 4,818,402 | 4/1989 | Steiner et al. | 210/413 |
| 4,822,486 | 4/1989 | Wilkins et al. | |
| 4,983,290 | 1/1991 | Schumann | 210/413 |

FOREIGN PATENT DOCUMENTS

1213823  4/1966  Fed. Rep. of Germany ...... 210/354

Primary Examiner—Robert A. Dawson
Assistant Examiner—W. L. Millard
Attorney, Agent, or Firm—Stratton, Bellomy, Ballew & Richardson

[57] ABSTRACT

A self-cleaning filter having an enclosed screen assembly, a rotatable mounted cleaning system located within the enclosed screen assembly, and a propulsion system which causes the cleaning system to rotate is disclosed. The cleaning system and the propulsion system use a frame with a fluid delivery system that is connectable to a pressurized fluid source. Fluid is delivered to propulsion apertures which generate propulsion fluid streams to provide the propulsion for the frame. Fluid also is delivered to a plurality of cleaning apertures which generate cleaning fluid streams that strike apertures in an outer cylindrical surface as the frame rotates. The cleaning fluid streams prevent clogging of the apertures in the outer cylindrical surface ensuring the filters function.

9 Claims, 8 Drawing Sheets

SELF-CLEANING FILTER

TECHNICAL FIELD

This invention relates to a self-cleaning filter for filtering fluids drawn from bodies of fluid. More particularly, this invention relates to a self-cleaning filter with an enclosed screen assembly, a cleaning system rotatable mounted within the enclosed screen assembly, and a propulsion system that causes the cleaning system to rotate and clean the screen portion of the enclosed screen assembly.

BACKGROUND OF THE INVENTION

Frequently, there is a need to draw fluid from a larger body of fluid where the quality and content of the fluid are relatively uncontrolled. A common example is drawing water from a pond, river, canal, or ditch for irrigation of agricultural lands. The water in such bodies frequently is full of debris which can be floating on the water's surface, suspended in the water, and resting on the bottom of the body. The debris can range in size and shape from trees or large tree limbs to small leaves and pieces of paper.

This debris presents several problems when the water is drawn by pump suction pipes. First, the debris can clog the inlet from the pump to the water source and prevent any water from being drawn. Also, smaller pieces of debris capable of passing through the pump inlet can cause damage to the pump which results in time loss and repairs costs from frequent breakdowns.

Separating liquid effluent from solid waste in waste treatment plants presents the same types of problems. The solid waste will either clog up the suction intake of the pump or pass into the pump causing pump failure. These types of problems occur whenever fluid is drawn from a body containing non-fluid debris.

This problem and attempts to solve it are well known. The obvious solution is to cover the end of the pump suction pipe inlet with a simple filter that allows passage of the water while blocking debris above a certain size. These simple filters suffer from the same sort of clogging problems discussed above and therefore have a limited usefulness.

Other attempts to solve these problems have used a more sophisticated filter that uses a rotary cylindrical filter screen assembly. Typically, the rotary cylindrical filter screen assembly rotates about stationary nozzles that direct spray against the inside of the filter screen assembly in an attempt to force debris away from the outside of the filter screen assembly.

While these filters are an improvement over the simple filter in some ways, they also present problems. First, a motive force must be provided to cause the rotary cylindrical filter screen assembly to rotate. In the larger versions of this type of filter, considerable force may be required to rotate the filter screen assembly.

The cleaning feature of this filter type will not function if the filter screen is prevented from rotating. As a result, the entire rotary cylindrical filter screen assembly must be held out of contact with other objects to ensure that it functions correctly. If the filter screen assembly is allowed to rest against the side or bottom of the body of the fluid, it will stop turning and the filter will clog quickly. The same thing can happen if a large piece of debris becomes entangled with the filter screen assembly. This filter, thus, does not provide a reliable solution to the problems.

As illustrated by the above discussion, there are a number of desirable features for a self-cleaning filter. It would be desirable to have a filter that was continually self-cleaning. It also would be desirable to have a self-cleaning filter that is reliable. Further, it would be desirable to have a self-cleaning filter that can operate regardless of the environment into which it is placed or the way it is oriented. In addition, it would be desirable to have a self-cleaning filter that is inexpensive and easy to maintain.

While the discussion herein relates to a self-cleaning filter, it is not intended that the invention be limited to this situation. It will be obvious from the description that follows that the present invention will be useful in other applications with problems common to those described herein.

DISCLOSURE OF THE INVENTION

It is an object of the present invention to provide a self-cleaning filter.

It is also an object of the present invention to provide a self-cleaning filter that can operate in any position or environment into which it is placed.

It is a further object of the present invention to provide a self-cleaning filter that is reliable.

It is yet another object of the present invention to provide a self-cleaning filter that is inexpensive and easy to maintain.

It is also an object of the present invention to provide a self-cleaning filter that is inexpensive to operate.

The present invention achieves these and other objectives which will become apparent from the description that follows, by providing a self-cleaning filter with a substantially hollow enclosed screen assembly, a cleaning system rotatable mounted within the enclosed screen assembly, and a propulsion system that provides a motive force to the cleaning system so that it can rotate inside of and relative to the enclosed screen assembly.

In a preferred embodiment of the invention, the enclosed screen assembly has a cylindrical body with a closed end and an inlet end. An exposed fluid permeable screen encircles and substantially encloses the cylindrical body, forming an outer cylindrical surface. The inlet end is attachable to an inlet of a suction device.

In another preferred embodiment of the present invention, a cleaning system is provided that has a frame with a top member, a bottom member, and at least one side member. The frame members are interconnected and assembled into a frame that is rotatable mounted to the enclosed screen assembly. There can be more than one side member, but at least one side member is proximate and substantially parallel to the outer cylindrical surface. The parallel side members has a plurality of cleaning apertures arrayed along the side member's length and oriented so that fluid passing through the cleaning apertures would be directed axially outwardly toward the outer cylindrical surface in plurality of streams.

In this embodiment, the enclosed screen assembly's side cross section has a substantially rectangular shape. Similarly, the assembled frame is substantially rectangular.

In an alternative preferred embodiment, at least the bottom and one side frame member are hollow, as is the bottom mount. In this embodiment, a fluid delivery system consists of a passage formed by the interconnection of at least these three pieces of the frame. The bottom mount has an attachment segment that is attachable to a pressurized fluid source. The top frame member and other side frame members also can be hollow and included as part of the fluid delivery system.

In another alternative preferred embodiment, the propulsion system consists a plurality of paddles which project from and are arrayed about the inside of the enclosed screen assembly. Each of the paddles have a planar surface that is oriented so that it is tilted at an angle relative to the longitudinal axis of the enclosed screen assembly. In this embodiment, there are propulsion apertures in the cleaning system frame members which can direct streams of fluid against the paddle planar surfaces when a pressurized fluid source is connected to the fluid delivery system. The assembled frame rotates about the rotatable mounts in reaction to the fluid from the propulsion apertures striking the paddle surfaces. As the assembled frame rotates, the fluid streams from the cleaning apertures strike the screen with sufficient force to clear debris and prevent clogging of the filter. It is possible that one set of apertures could serve as both the cleaning and propulsion apertures.

A further preferred embodiment of the present invention is virtually identical to the above embodiments with the exception of the propulsion system. In this embodiment, the propulsion system uses electric motors to rotate the cleaning system.

Other preferred alternative embodiments of the present invention use an enclosed screen assembly with a variety of side cross section shapes, such as trapezoidal, circular, etc. In this embodiment, the cleaning frame members also are connected together to form a shape substantially similar to the corresponding side cross section shape. Thus, any side members substantially are parallel with the screen, as with the above embodiments.

DETAILED DESCRIPTION OF PREFERRED EMBODIMENTS

Figure 1:
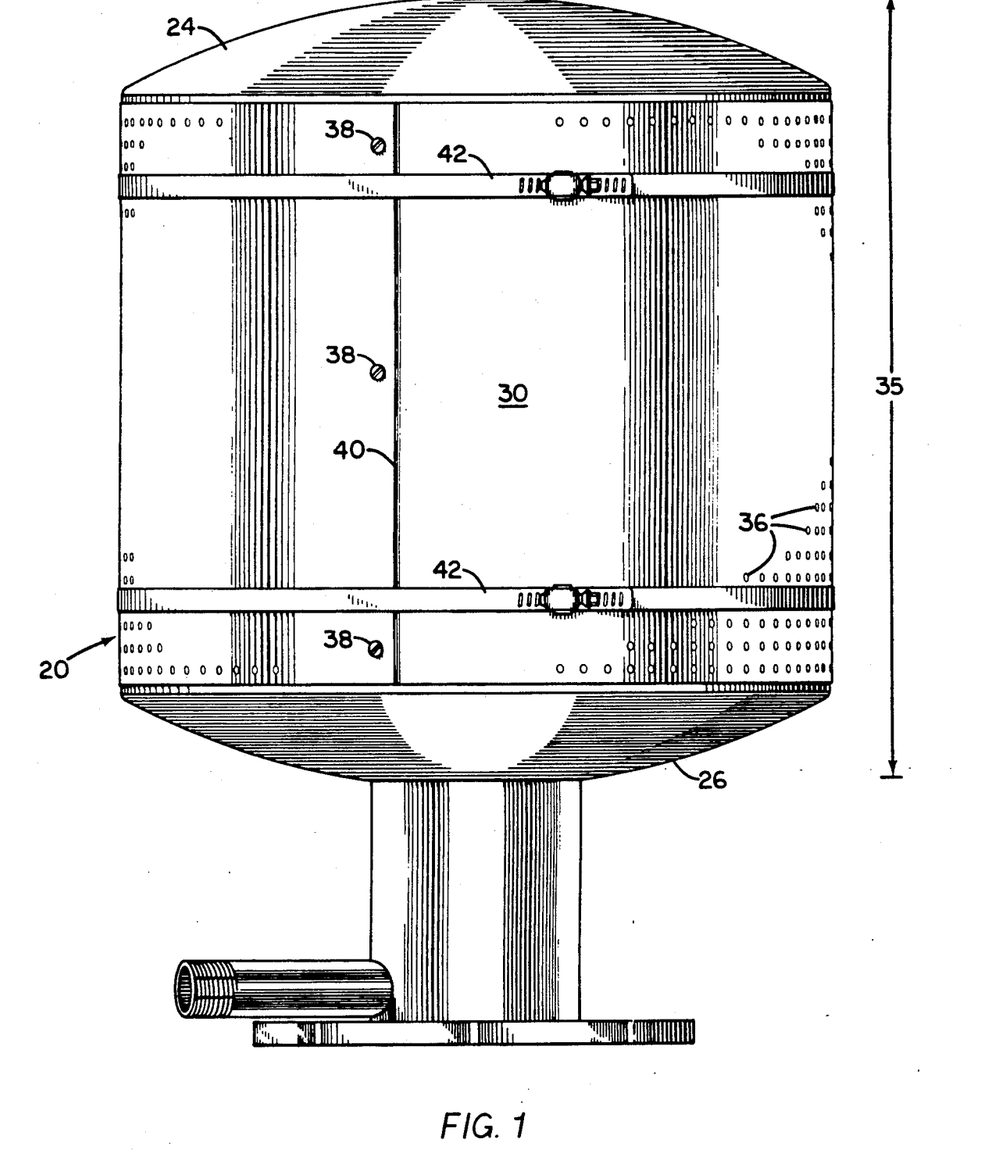
FIG. 1 is a side elevation view of a preferred embodiment constructed in accordance with the present invention.
Figure 2:
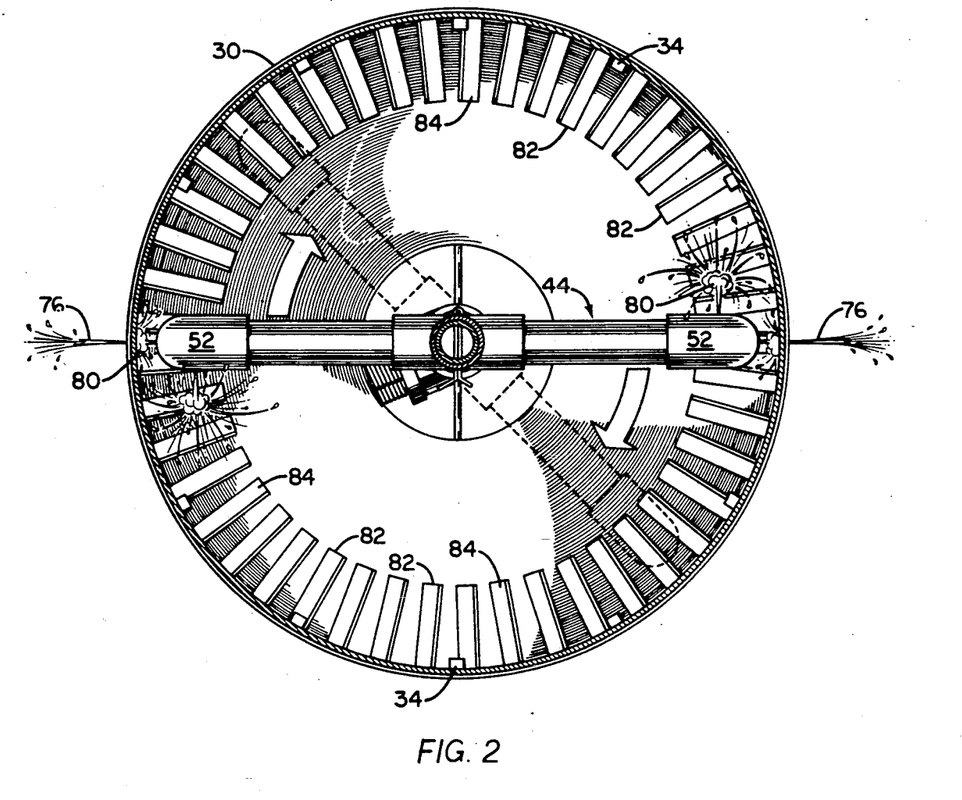
FIG. 2 is a top cross section view of a preferred embodiment constructed in accordance with the present invention taken along lines 2-2 in FIG. 1.
Figure 3:
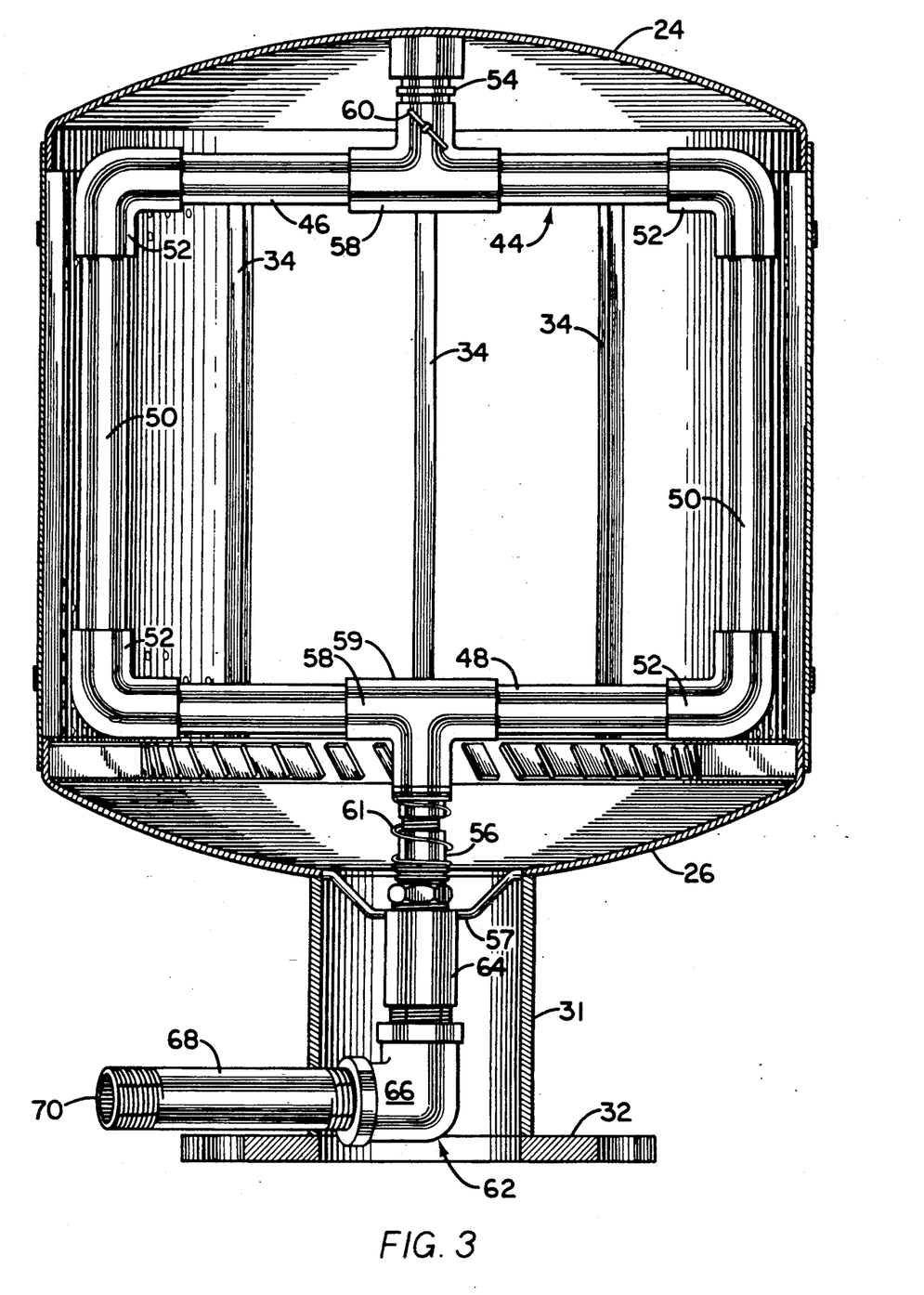
FIG. 3 is a side cross section view of a preferred embodiment constructed in accordance with the present invention taken along lines 3-3 in FIG. 2.

With reference to FIGS. 1-3, a self-cleaning filter is shown. The enclosed screen assembly 20 has a cylindrical body 22 with a closed end 24, an inlet end 26, and outer cylindrical surface 30. The outer cylindrical surface is formed from an exposed fluid permeable sheet wrapped around the cylindrical body sides. As shown in FIG. 3, the cylindrical body closed end and inlet end are substantially parallel to one another and are connected together by a plurality of support members 34 arrayed about the edges of the two ends. The height 35 of the cylindrical body is determined by the support members length, which is substantially equal for all members.

In this embodiment, the outer cylindrical surface 30 has a plurality of apertures 36 through it. The outer cylindrical surface is held in place by screws 38 through the overlapping ends 40 and by bands 42 around outer cylindrical surface.

Any number of materials can be used to form the outer cylindrical surface 30 and its attachment mechanisms, as long as the materials are sufficiently strong, durable, flexible, and lightweight to allow the filter to function reliably. For example, success has achieved using a stainless steel sheet with adjustable metal bands similar t the adjustable metal hose clamps used for automobiles and the like.

Other types of bands and attachment mechanisms can be used with equal success. For example, the exposed screen could be welded or otherwise permanently affixed to the cylindrical body. If the material used to form the outer cylindrical surface 30 is sufficiently strong and permanently affixed to the cylindrical body in this configuration, it is possible that the enclosed screen assembly could be constructed without the support members, at least for some applications.

While the dimensions of the enclosed screen assembly can vary greatly with the desired application, successful results have already been obtained with enclosed screen assembly having diameters from 10 inches (25.4 cm) to 36 inches (91.4 cm), and overall heights of 12 inches (30.5 cm) to 60 inches (152.4 cm). The stainless steel sheets used in this application have a thickness of 0.017 inches (0.043 cm) to 0.030 inches 0.076 cm).

The closed and inlet ends as well as the support members have been successfully constructed from mild steel, primarily because of its economical price and the ease with which it can be fabricated. Any material that has sufficient hardness and durability and that can be fabricated into the desired shapes can also be used for these components, including aluminum, stainless steel, bronze, and plastics.

Within the enclosed screen assembly 20 is a frame 44 which forms part of the cleaning system. The frame is constructed from a top member 46, a bottom member 48, and two side members 50, with connecting joints 52 acting to connect the frame members together to form the assembled frame. In this embodiment, the assembled frame is rotatable suspended within the enclosed screen assembly 20 having a rotatable top mount 54 which is attached to the screen assembly closed end 24 and a rotatable bottom mount 56 which connects the assembled frame to the screen assembly open end 26. The rotatable bottom mount is held in place by a plurality of substantially rigid locator arms 57 which rigidly hold the rotatable bottom mount while allowing the passage of fluids around them through the enclosed screen assembly open end 26. The rotatable top and bottom mounts may either be bearings or contain bearings to allow the frame to rotate.

Attaching the top frame member 46 and the bottom frame member 48 to the corresponding rotatable to 54 and bottom 56 mounts are two mount connectors 58. The top and bottom frame members may either slide through the top portion 59 of the mount connectors. Alternatively, the top and bottom members may actually be comprised of two separate sections which fit between the mount connectors and the corresponding connecting joints.

In this particular embodiment the top 46, bottom 48, and side 50 members of the frame are hollow, as are the connecting joints 52 and the mount connectors 58 so that the assembled frame forms an enclosed passage through which fluids may flow. The various frame members, connecting joints, and mount connectors can be assembled from pipes of any number of materials. Success has been achieved using polyvinylchloride pipe having a diameter of 1 inches (2.54 cm) although this size can vary greatly depending on the application. Other materials can be used provided that they have sufficient rigidity and strength while retaining a relatively light weight to minimize the rotating mass of the assembled frame 44. Cost also is a consideration in material selection. Some possible materials are aluminum or ABS plastic.

Should it become necessary to remove frame 44 from the enclosed screen assembly 20, pin 60 is removed from the mount connector 58 on the top member 46 of the frame and the entire frame is pushed down on spring 61. This allows the mount connector adjacent to the rotatable top mount 54 to be pulled clear of the rotatable top mount then the mount connector adjacent the rotatable bottom mount 56 can also be pulled clear and the frame removed.

As discussed below, it is important for the overall function of the invention, that the locator arms 57 hold the rotatable bottom mount 56 in position while minimizing any obstruction of the fluid flow during the operation of the filter.

Figure 4:
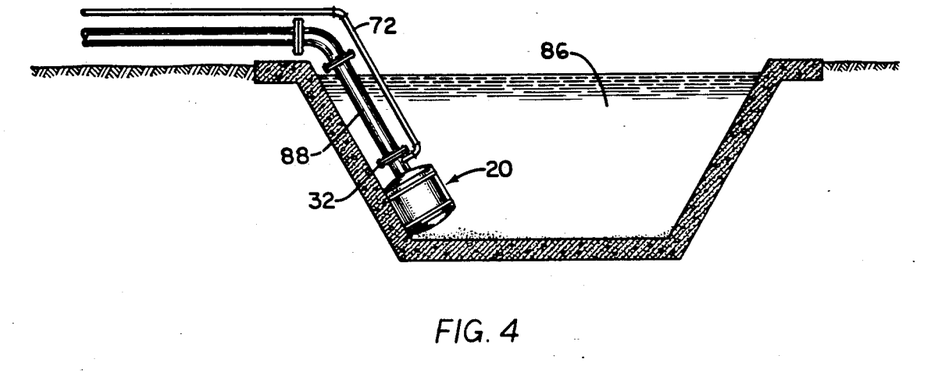
FIG. 4 is a side environmental view of a preferred embodiment constructed in accordance with the present invention.
Figure 5:
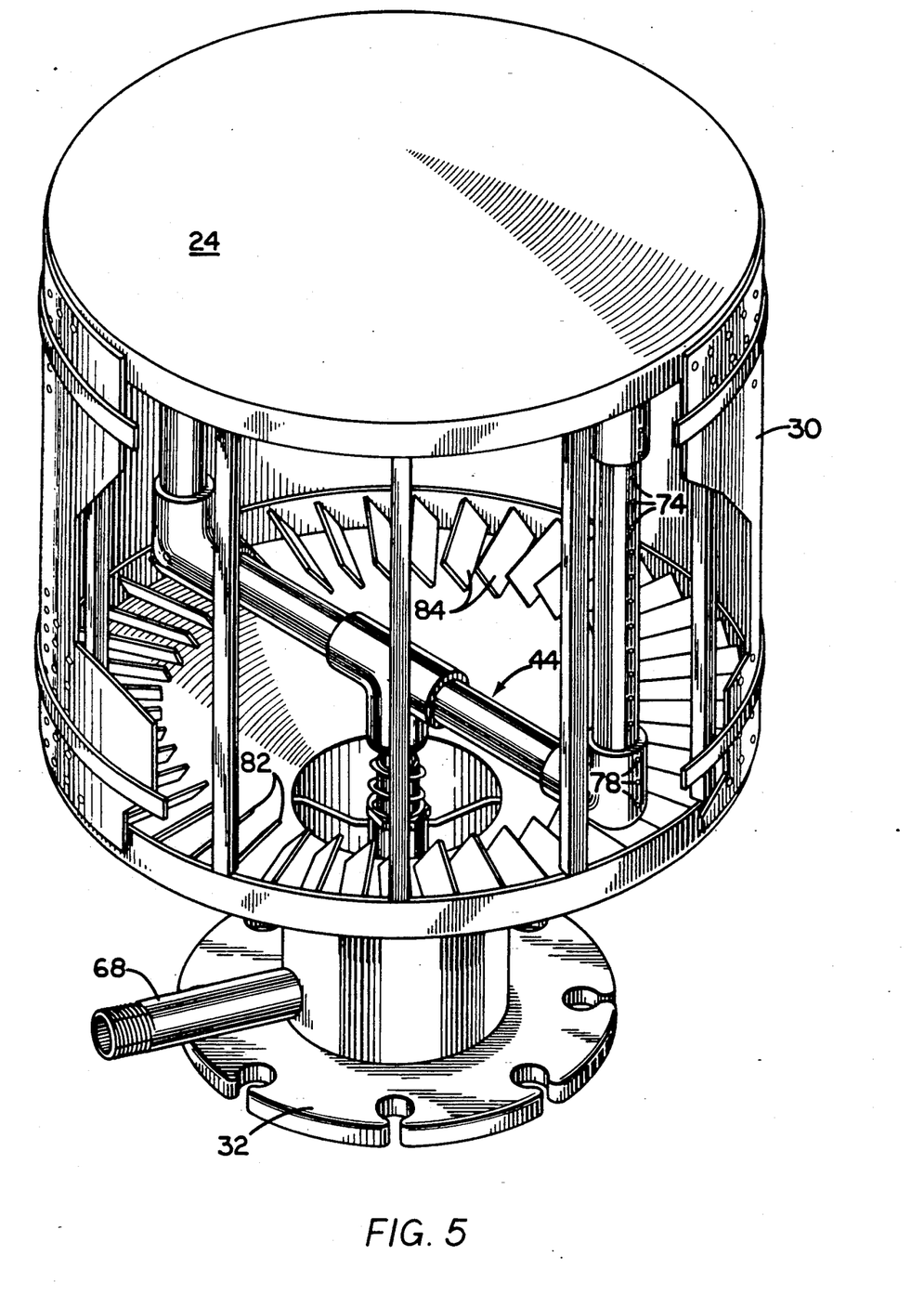
FIG. 5 is a cutaway perspective view of a preferred embodiment constructed in accordance with the present invention.

Extending downward from the rotatable bottom mount is an input connector system 62 which consists primarily of a threaded inlet 64 at the bottom of the rotatable bottom mount, an elbow joint 66, and an extension pipe 68. All of these pieces can be threaded together from common plumbing fittings made of metal or plastic. As illustrated in FIGS. 3 and 5, the extension pipe extends through the side of the inlet conduit 31 between the enclosed screen assembly open end 26 and the inlet flange 32. The extension pipe exposed end 70 is threaded so that it is connectable to a pressurized fluid source through a fluid pipe 72 as illustrated in FIG. 4. The assembled input connector system 62, mount connector 58, and assembled frame 44 constitute a substantially enclosed fluid delivery system.

In this preferred embodiment, the functions of the cleaning system and the propulsion system are both accomplished by the assembled frame 44, the rotatable top and bottom mounts 54 and 56, mount connectors 58, and fluid delivery system. There are a plurality of cleaning apertures 74 arrayed along the length of each side member 50 These apertures are oriented so that any fluids passing into the frame and through the cleaning apertures will be directed radially outward toward the outer cylindrical surface 30. The cleaning apertures may also pass through those portions of the connector joints which overlap the side members. When the extension pipe is connected to a pressurized fluid source, the water passes through into the input connector system 62 to the bottom connector joint 58, and into the assembled frame 44. The cleaning apertures direct cleaning fluid streams 76 outward to the outer cylindrical surface 30. These fluid streams serve to clean and unclog the apertures 36 in the outer cylindrical surface. This is best illustrated in FIG. 2.

There also are propulsion apertures 78 through the connecting joints 52 which connect the bottom member 48 to the side members 50 in the assembled frame 44. These apertures direct propulsion fluid streams 80 out from the frame in a direction that is roughly tangential to the outer cylindrical surface 30. The propulsion fluid streams also are directed at a downward angle relative to the horizontal plane.

In this preferred embodiment, as part of the propulsion system, there are a plurality of paddles 82 which project from and are arrayed about the inside of the enclosed screen 20 approximate the open end 26. The paddles are oriented so that their planar surfaces 84 are at an angle with respect to the longitudinal axis of the enclosed screen assembly. The exact angle is determined in conjunction with the propulsion aperture 78 so that when the propulsion fluid streams 80 strike the paddles, they are substantially normal to the paddle planar surface, as illustrated in FIG. 2.

In this preferred embodiment, when the extension pipe 68 is connected to a pressurized fluid source 72, fluid flows through the input connector system 62 and the connector joint 58 into the assembled frame 44. The fluid then flows through both the propulsion apertures 78 and the cleaning apertures 74, as shown in FIG. 2. The propulsion fluid streams 80 strike the paddles 82 and in reaction the frame 44 begins to rotate. As the frame rotates, the cleaning fluid streams 76 strike, clean, and unclog apertures 36 in the outer cylindrical surface 30 of the enclosed screen assembly 20. As long as the pressurized fluid source is connected and turned on, the frame will be rotated by the propulsion fluid streams 80 striking the paddles 82 and the apertures 36 of the outer cylindrical surface 30 will remain cleaned and unclogged as it is sprayed by cleaning fluid stream 76 twice for each rotation of the frame 44.

To remove filtered water from a body of water 86, the inlet flange 32 is attached to an intake pipe 88 for a suction device (not shown), and the extension pipe 68 is attached to a pressurized water pipe 72. The filter 20 then is placed in the body of water with the frame 44 rotating within the enclosed screen assembly 20. The suction device pulls water through the apertures 36 in the outer cylindrical surface 30 past the rotatable bottom mount 56 through the inlet conduit 31 and into the intake pipe 88. As the water is pulled through the apertures in the outer cylindrical surface by the suction device, debris contained in the water is brought into and can clog the apertures. The cleaning fluid streams 76 from the cleaning apertures 74 in the frame side members 50 strike and pass through the apertures 36 twice in every complete rotation of the frame, keeping the outer cylindrical surface open so that the flow of water through the filter and into the suction device can continue unimpeded.

The above preferred embodiment places the paddles 82 and the propulsion apertures 78 around and proximate, the open end 26 of the enclosed screen assembly 20, the invention would work equally well with the paddles arrayed about and approximate the closed end 24 of the enclosed screen assembly. In this alternative preferred embodiment, the propulsion apertures would be placed in the connector joints 58 which connect the top member 46 to the side members 50 and the propulsion fluid streams 80 would project it at an upper angle so that the propulsion fluid streams would still be normal to the paddle planar surface 84.

Figure 2A:
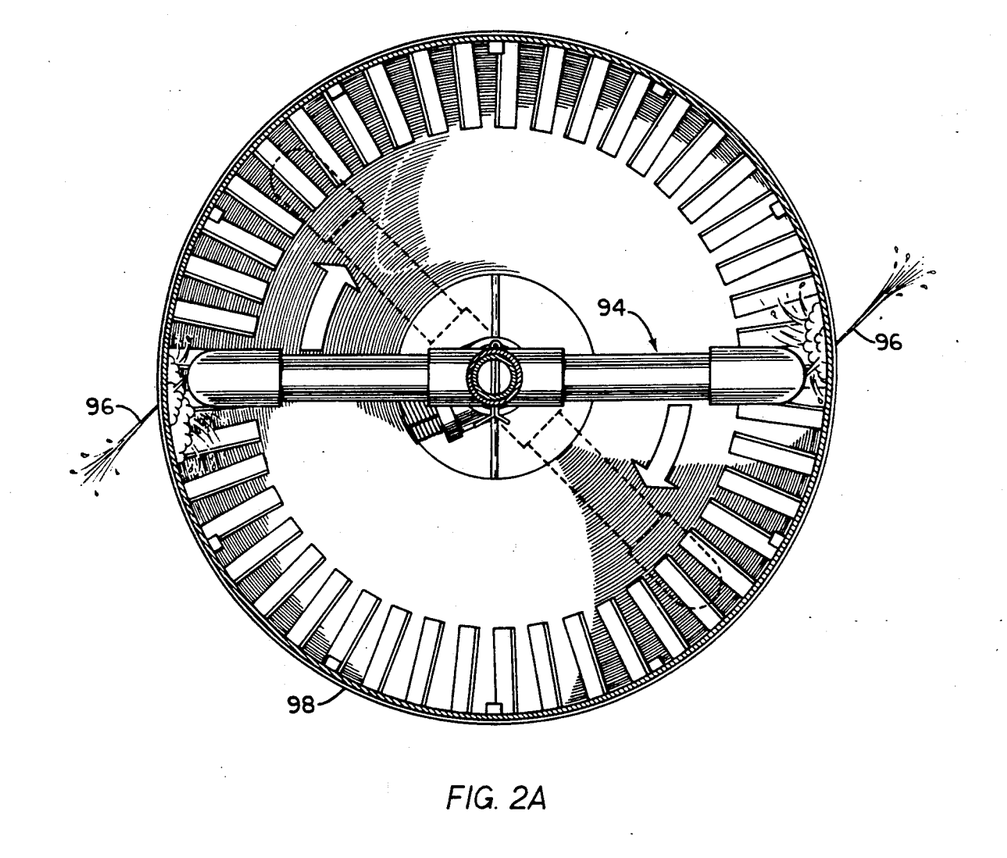
FIG. 2A is a top cross section view of an alternative preferred embodiment constructed in accordance with the present invention.

Another alternative preferred embodiment of the present invention uses a single plurality of apertures for each side member to function both as the cleaning system and the propulsion system. In this alternative preferred embodiment, the apertures are arrayed along the side members of an assembled frame 94, much as is done in the above embodiment. As shown in FIG. 2A, however, the apertures are oriented so that when fluid is forced through the frame, the resulting fluid streams 96 strike the outer cylindrical surface 98 at an angle other than 90 degrees. This provides a tangential component to the fluid streams velocity vector, which in turn, causes the frame to rotate in reaction to the fluid streams striking the outer cylindrical surface.

In this embodiment, the angle of the water streams relative to the outer cylindrical surface may not be too great or the cleaning function may suffer. Propulsion in cleaning systems of this alternative preferred embodiment do not require separate propulsion apertures and paddles, but could be used in combination with the propulsion system of the preferred embodiments to provide greater propulsive force to the frame if that were required in a particular application.

Figure 3A:
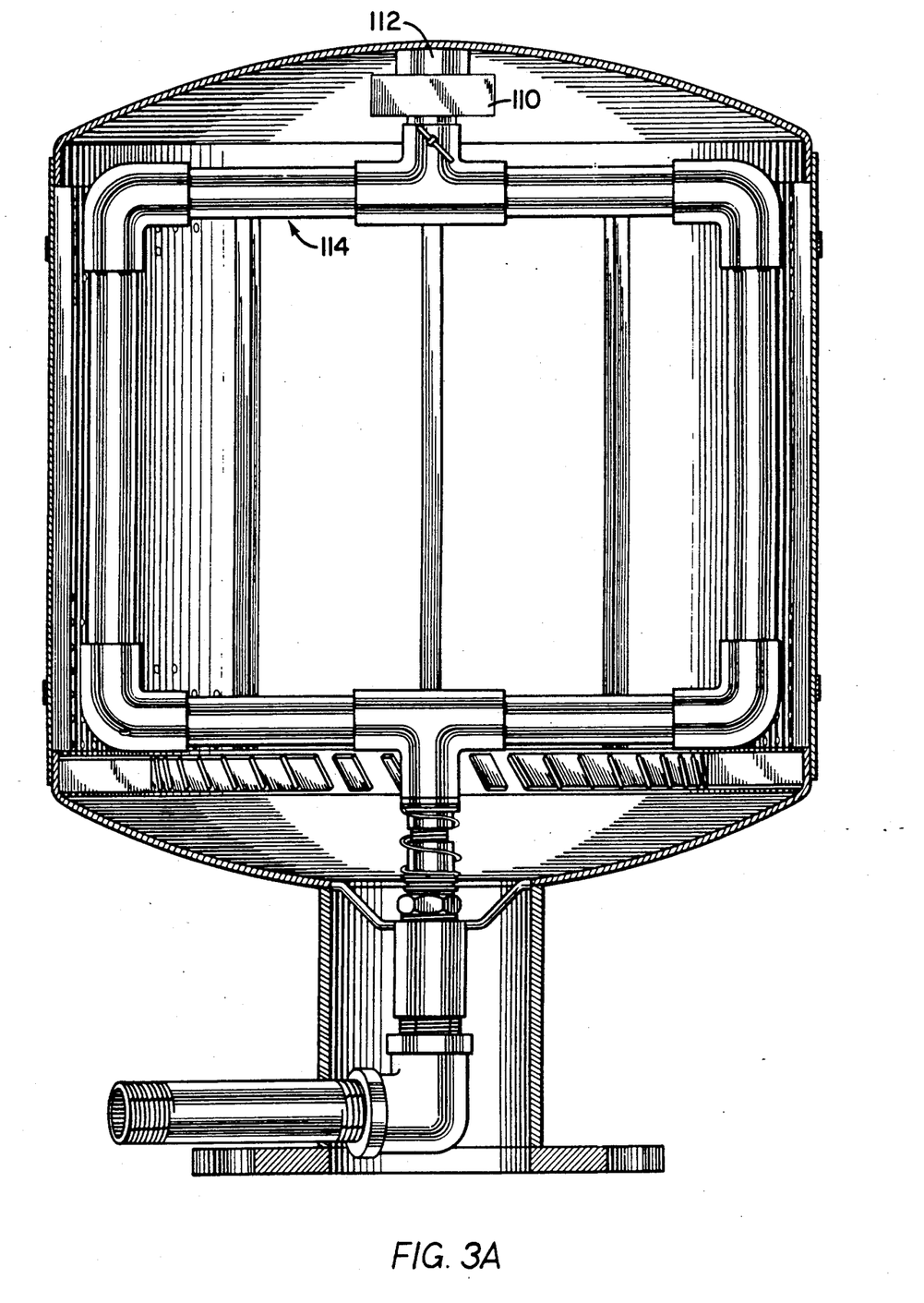
FIG. 3A is a side cross section view of a second alternative preferred embodiment constructed in accordance with the present invention.

For the above alternative preferred embodiment utilized a pressurized water source for the cleaning system as well as the propulsion system, a separate propulsion system can also be used. As illustrated in FIG. 3B, a separate electric motor 110 can be attached to one of the rotatable mounts, in this case top mount 112, to provide the propulsive force to rotate frame 114. With this alternative preferred embodiment, the cleaning system is virtually identical to that discussed in the above embodiment.

Figure 6:
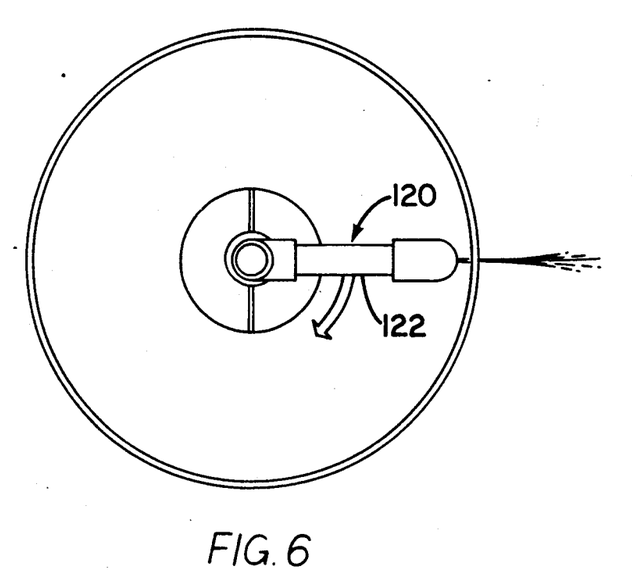
FIG. 6 is a schematic top cross section view of a third alterative preferred embodiment constructed in accordance with the present invention.
Figure 6A:
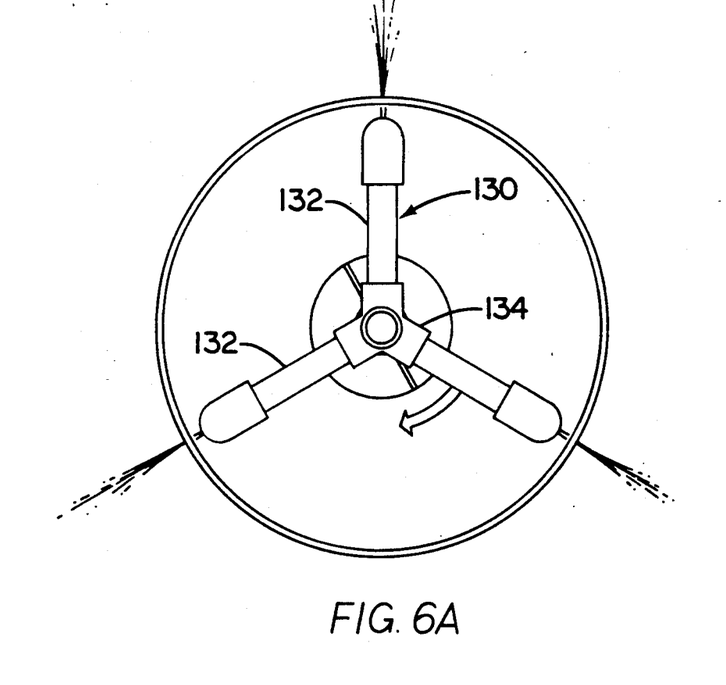
FIG. 6A is a schematic top cross section view of a fourth alterative preferred embodiment constructed in accordance with the present invention.

Although all of the above preferred embodiments utilize a frame with two side members, this configuration is not envisioned as a limitation on the possible embodiments of the present invention. As shown in FIGS. 6 and 6A, any number of side members are possible. The only real modification in terms of the assembled frame is that the connector joint will be modified to connect multiple frame segments. For example, FIG. 6 shows a frame 120 with top member 122 connected to a single side member (not shown). FIG. 6A illustrates a alternative preferred embodiment which has a frame 130 that has a connector joint 134 is modified to accommodate a corresponding top member 136 for each of four side members (not shown).

The number of side members is limited only by practical limitations on the number of top members that can be accommodated in single connector joint and on the number of side members needed to keep the filter clear and unclogged in a particular application. By increasing the number of side members, one increases the number of times the apertures for the outer cylindrical surface are cleaned on a single rotation of the frame, e.g. four side members means that the outer cylindrical surface will be cleaned four times in a single rotation of the frame as opposed to two times with two side members.

Similarly, although the embodiments discussed above all have a side cross section with a shape that is substantially square or rectangular, the possible shapes of the side cross section of the embodiments of the present invention are limited only by factual manufacturing considerations and the requirements of a particular application. The only functional limitation for the shape of the side cross section of the present invention is that the shape of the enclosed screen assembly and of the assembled frame must be such that the outer cylindrical surface and the side members of the frame are substantially parallel and approximate one another during the rotation of the frame.

Figure 7:
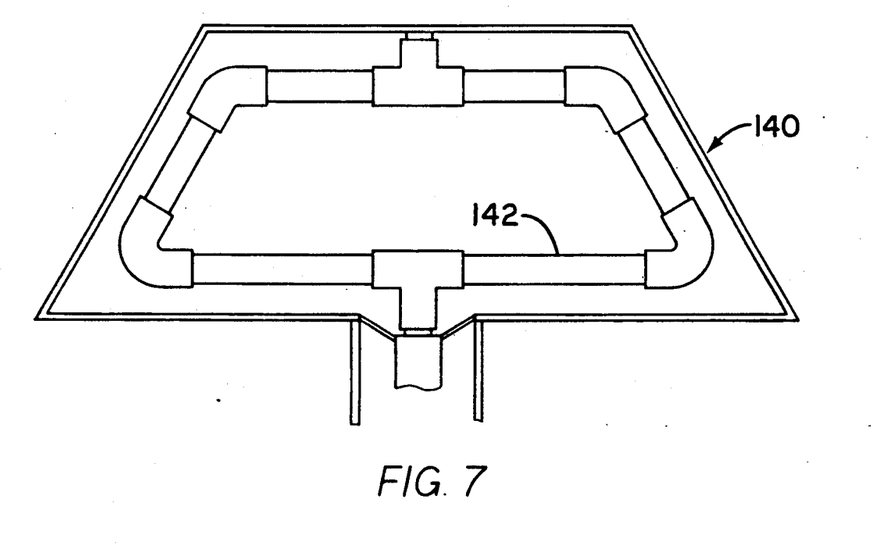
FIG. 7 is a schematic side cross section view of a fifth alterative preferred embodiment constructed in accordance with the present invention.
Figure 7A:
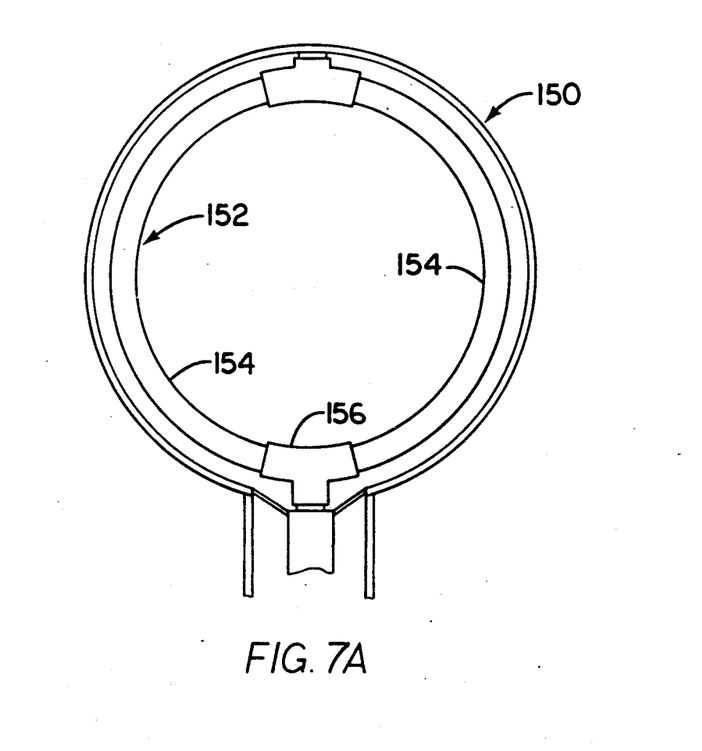
FIG. 7A is a schematic side cross section view of a sixth alterative preferred embodiment constructed in accordance with the present invention.

Other possible side cross section shapes for embodiment constructed in accordance with the present invention are shown in FIGS. 7 and 7A. FIG. 7 shows an alternative preferred embodiment of the present invention for the enclosed screen assembly 140 and the assembled frame 142 of a side cross section which has a substantially trapezoidal shape. FIG. 7A shows a enclosed screen assembly 150 and an assembled frame 152 having a side cross section with a shape that is substantially circular. It should be noted that in this embodiment that the frame consist primarily of side members 154 and connector joints 156 without separate top and bottom members.

Regardless of the embodiment or combination of embodiments used the present invention provides a self cleaning filter that functions under almost any condition so long as pressurized water or electrical power is provided to a propulsion system and cleaning system and the enclosed screen assembly is not breached. By having the enclosed screen assembly function both as the filter and the protective shell while remaining stationary, the present invention provides a self cleaning filter device that is reliable, easy and more efficient to operate.

INDUSTRIAL APPLICABILITY

This invention would be useful in any situation where it is desirable to have a self-cleaning filter that can be used in bodies of water and other fluids that is reliable and efficient to operate.

In compliance with the statute, the invention has been described in a language more or less specific as to structural features It is understood, however, that the invention is not limited to the specific features shown, since the means and construction herein disclosed comprise preferred forms of putting the invention to effect. The invention is, therefore, claimed in any of its forms or modifications within the legitimate and valid scope of the appended claims.

I claim:

1. A self-cleaning filter, said self-cleaning filter comprising:
    an enclosed screen assembly, said enclosed screen assembly being substantially hollow, attachable to an inlet for drawing fluid from a fluid source and having an exposed, substantially fluid permeable screen to pass fluid from said fluid source to said inlet;
    a cleaning system, said cleaning system rotatable mounted to and located substantially within said enclosed screen assembly and said cleaning system further having the capacity to deliver a plurality of outwardly directed cleaning fluid streams; and a propulsion system, said propulsion system located proximate said cleaning system so that said propulsion system causes said cleaning system to rotate relative to said enclosed screen assembly.

2. A self-cleaning filter as claimed in claim 1, said enclosed screen assembly further comprising:

a cylindrical body, said cylindrical body having an outer cylindrical surface formed from said exposed, substantially fluid permeable screen that substantially encloses said cylindrical body, a closed end, and an inlet end.

3. A self-cleaning filter as claimed in claim 2 wherein said inlet end is attachable to an inlet of a suction device.

4. A self-cleaning filter as claimed in claim 3, said cleaning system further comprising:

a frame having a top member, a bottom member, and at least one side member, at least one said frame member being proximate and parallel to said outer cylindrical surface;

a plurality of cleaning apertures arrayed along at least one parallel side member and oriented so that fluid forced through said apertures would be directed radially outward toward said outer cylindrical surface in said cleaning fluid streams; and a fluid delivery system, said fluid delivery system being capable of supplying fluid to said cleaning apertures, and said fluid delivery system being attachable to a pressurized fluid source.

5. A self-cleaning filter as claimed in claim 2, said cleaning system further comprising:

a frame having a top member, a bottom member, and at least one side member, at least one said frame member being proximate and parallel to said outer cylindrical surface;

a plurality of cleaning apertures arrayed along at least one parallel side member and oriented so that fluid forced through said apertures would be directed radially outward toward said outer cylindrical surface in said cleaning fluid streams; and a fluid delivery system, said fluid delivery system being capable of supplying fluid to said cleaning apertures, and said fluid delivery system being attachable to a pressurized fluid source.

6. A self-cleaning filter as claimed in claim 4, said propulsion system further comprising:

a plurality of paddles, said paddles attached within and arrayed about said enclosed screen assembly, each said paddle having a planar surface with each said planar surface being oriented at an angle to a horizontal plane; and at least one propulsion aperture, each said aperture being located ins aid frame and being able to receive fluid from said fluid delivery system to generate a propulsion fluid stream, each said propulsion fluid stream striking said paddles substantially normal to said paddle planar surfaces.

7. A self-cleaning filter as claimed in claim 4, said propulsion system further comprising a motor attached to said frame.

8. A self-cleaning filter as claimed in claim 6, said propulsion system further comprising said cleaning apertures being oriented to direct said cleaning fluid streams against said outer cylindrical surface at an angle to create a horizontal velocity vector in each said cleaning fluid stream which causes said frame to rotate in reaction to said cleaning fluid streams striking said outer cylindrical surfaces.

9. A self-cleaning filter as claimed in claim 4, said propulsion system further comprising said cleaning apertures being oriented to direct said cleaning fluid streams against said outer cylindrical surface at an angle to create a horizontal velocity vector in each said cleaning fluid stream which causes said frame to rotate in reaction to said cleaning fluid streams striking said outer cylindrical surfaces.

* * * * *